(12) United States Patent
Knapp

(10) Patent No.: US 8,087,639 B1
(45) Date of Patent: Jan. 3, 2012

(54) OXYGEN TANK KEY

(76) Inventor: Joshua Knapp, New York, NY (US)

( * ) Notice: Subject to any disclaimer, the term of this patent is extended or adjusted under 35 U.S.C. 154(b) by 538 days.

(21) Appl. No.: 12/006,174

(22) Filed: Dec. 31, 2007

(51) Int. Cl.
*F16K 31/44* (2006.01)

(52) U.S. Cl. .......... 251/235; 251/292; 251/293; 74/528; 74/543; 7/167; 7/169; 81/176.2; 81/124.2; 81/124.3; 81/124.4

(58) Field of Classification Search .................. 251/292, 251/291, 235, 231, 293; 74/543, 528, 526, 74/536, 537; 7/167, 168, 138, 169; D8/16, D8/17, 19, 107, 21, 27, 29, 28; 81/124.4, 81/124.7, 176.1, 176.15, 176.2, 119, 124.2–124.4
See application file for complete search history.

(56) References Cited

U.S. PATENT DOCUMENTS

| | | |
|---|---|---|
| 1,867,372 A | 7/1932 | McGuckin |
| D267,392 S | 12/1982 | Hildebrandt |
| D268,086 S | 3/1983 | Waters, Jr. |
| D268,087 S | 3/1983 | Truefitt |
| D274,404 S | 6/1984 | Adler |
| D300,000 S | 2/1989 | Reinhardt |
| D301,010 S | 5/1989 | Renna |
| 4,871,144 A | 10/1989 | Kaniaris |
| D333,243 S * | 2/1993 | Brown .............................. D8/21 |
| D338,815 S | 8/1993 | Wintle, Jr. |
| D344,437 S | 2/1994 | Cleland et al. |
| 5,456,278 A | 10/1995 | Morris et al. |
| 5,461,950 A * | 10/1995 | Iwinski ............................ 81/61 |
| D398,493 S | 9/1998 | Jones |
| D404,986 S | 2/1999 | Mahon |
| D418,727 S | 1/2000 | Hsieh |
| D438,437 S | 3/2001 | Halstead |
| D472,777 S | 4/2003 | Halstead |
| 6,851,337 B2 | 2/2005 | Stokes |

* cited by examiner

*Primary Examiner* — John Fristoe, Jr.
*Assistant Examiner* — Marina Tietjen
(74) *Attorney, Agent, or Firm* — Norman E. Lehrer

(57) ABSTRACT

An oxygen tank key includes an elongated substantially thin flat handle portion defining a first plane and having first and second ends that define the length thereof and first and second side edges that define the width. A socket, integrally formed with the handle portion between the two ends, has a thickness that is greater than the thickness of the handle portion. The socket includes an aperture that opens adjacent one of the side edges and has a depth extending substantially the width of the handle portion. The aperture has a substantially rectangular cross-section and is adapted to fit onto the rectangularly shaped end of an oxygen tank valve control stem. A slot passes through the handle and is elongated in the direction of the length of the handle. The slot includes champhered ends and is adapted to fit over the lever of a regulator for the oxygen tank to help release the regulator from the tank.

2 Claims, 2 Drawing Sheets

OXYGEN TANK KEY

BACKGROUND OF THE INVENTION

The present invention is directed toward an oxygen tank key and more particularly toward an oxygen tank key that makes it easier for an operator to turn a tank on and off and to disconnect the regulator from the tank when desired.

Portable oxygen tanks are frequently use by numerous patients having a variety of medical conditions that require them to supplement their oxygen intake. Under some situations, the tanks are left on for long periods of time. In other situations, the tanks must be turned on and off with considerable frequency. It is also common for emergency medical technicians and other first responders to administer oxygen to patients through the use of portable oxygen tanks.

Oxygen tanks must, of course, be turned on when needed and off when not. For this purpose, they are provided with a conventional valve which is opened by rotating the same counter clockwise and is closed by rotating the valve clockwise. In some cases, the valve stem of an oxygen tank is provided with an attached handle or the like to aid in rotating the valve into its open or closed position. Most tanks, however, do not include a handle. This is done to prevent someone from inadvertently turning the tank on when not needed and exhausting the oxygen or inadvertently turning the tank off when it is needed.

In lieu of an attached handle, most oxygen tanks are opened and closed through the use of a wrench or key that can be temporarily applied to the rectangularly shaped top of the valve stem. Conventional keys are made from thin cast or sheet metal or the like that include a rectangular opening therein that is adapted to cooperate with the top of the valve stem. Such keys are useful for closing a valve but are frequently difficult to use when trying to open the same particularly if the valve had been closed too tightly. When using a conventional key, the operator's hand must engage the narrow side edge of the key. This is uncomfortable and frequently can become painful, particularly after numerous operations. One form of a prior art key is shown, for example, in U.S. Pat. No. 4,871,144 that issued in 1989 to Kaniaris.

As is well known, oxygen from a tank must first pass through a regulator before being used by a patient. Such regulators are attached to the tank by clockwise rotating a thumb screw or lever connected to a screw thread that clamps the regulator into place. The regulator is removed by rotating the lever in the counterclockwise direction. Sometimes the clamp is so tight that it is difficult to rotate the same. When this occurs, a wrench or other tool must be used. Conventional oxygen keys are of little use for this purpose as they are designed solely to aid in turning the valve stem of an oxygen tank on and off. They cannot engage or turn a regulator lever. While the Kaniaris patented device referred to above suggests that it can be use for this purpose, it does not appear to provide the mechanical advantage that may be needed to loosen a regulator clamp that has been over tightened. Furthermore, the Kaniaris device can damage the thumb screw, making the unit inoperable, because pressure is applied to the thumb screw at an acute point of the tool, instead of at a mated surface.

A need, therefore, exists for a tool that is easy and comfortable to use for turning an oxygen tank on and off and which also can be used to help attach or detach a regulator to or from a tank.

SUMMARY OF THE INVENTION

The present invention is intended to overcome the deficiencies of the prior art discussed above. It is an object of the present invention to provide an oxygen tank key that is easy and comfortable to operate.

It is another object of the present invention to provide an oxygen tank key that can also be utilized to aid in the detachment of a regulator from an oxygen tank.

In accordance with the illustrative embodiments demonstrating features and advantages of the present invention, there is provided an oxygen tank key that includes an elongated substantially thin flat handle portion defining a first plane and having first and second ends that define the length thereof and first and second side edges that define the width. A socket, integrally formed with the handle portion between the two ends, has a thickness that is greater than the thickness of the handle portion. The socket includes an aperture that opens adjacent one of the side edges and has a depth extending substantially the width of the handle portion. The aperture has a substantially rectangular cross-section and is adapted to fit onto the rectangularly shaped end of an oxygen tank valve control stem. A slot passes through the handle and is elongated in the direction of the length of the handle. The slot includes champhered ends and is adapted to fit over the lever of a regulator for the oxygen tank to help release the regulator from the tank.

Other objects, features, and advantages of the invention will be readily apparent from the following detailed description of preferred embodiments thereof taken in conjunction with the drawings.

BRIEF DESCRIPTION OF THE DRAWINGS

For the purpose of illustration the invention, there is shown in the accompanying drawings one form which is presently preferred; it being understood that the invention is not intended to be limited to the precise arrangements and instrumentalities shown.

DETAILED DESCRIPTION OF THE PREFERRED EMBODIMENT

Figure 1:
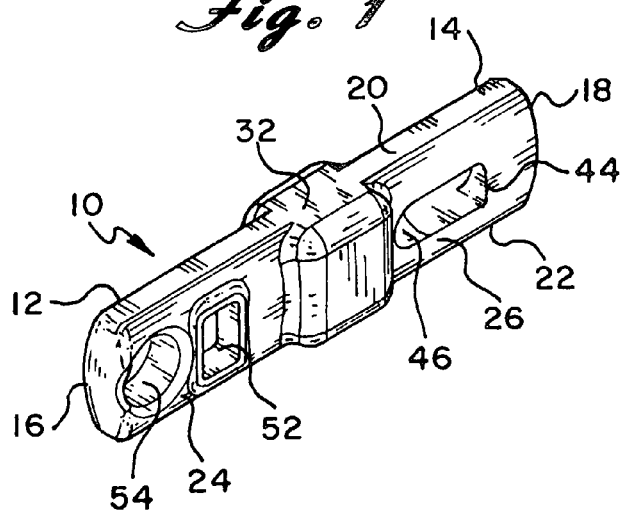
FIG. 1 is a top front perspective view of an oxygen tank key in accordance with my inventions.
Figure 2:
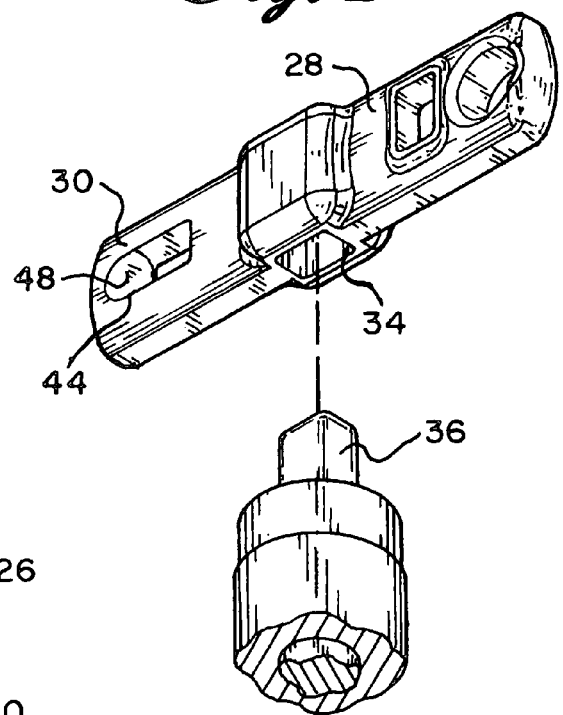
FIG. 2 is a bottom rear perspective view thereof showing how the same is attached to the valve stem of an oxygen tank.

Referring now to the several drawings in detail wherein like reference numerals have been used throughout the various figures to designate like elements, there is shown in FIGS. 1 and 2 the details of an oxygen tank key constructed in accordance with the principles of the present invention and designated generally as 10.

The oxygen tank key 10 is comprised essentially of a block of preferably cast aluminum or plastic or other similar material and includes elongated substantially thin flat handle portions 12 and 14 which define a first plane. The key 10 can be molded or cast or machined from a block of material. The handle portions 12 and 14 have a first end 16 and a second end 18 that define the length of the tank key 10 and also include a first side edge 20 and a second side edge 22 that define the width of the key. The length of the key 10 between the first and second ends 16 and 18 is preferably between 3 to 4 inches. Preferably, the height of the key between the first and second side edges 20 and 22 is preferably between ¾ inch and 1 inch. In addition, the thickness of the flat handle portions 12 and 14 of the key 10 are preferably between 3/16 inch and ⅜ inch.

The foregoing dimensions are, of course, by way of example only. However, and as will be made clearer hereinafter, it is important to the operation of the present invention that the planar front faces 24 and 26 and the planar rear surfaces 28 and 30 of the first and second handle portions 12 and 14 be substantially flat and have a relatively wide surface that is substantially greater than the thickness of the edges 20 and 22.

A socket 32 is integrally formed with the handle portions 12 and 14. As can be seen, the socket 32 has a thickness which is substantially greater than the thickness of the handle portions 12 and 14. In the embodiment shown in the figures, the socket 32 is located intermediate the ends 16 and 18 of the key 10. This is, however, by way of example only. It is within the scope of the present invention to locate the socket at one end of the key 10 or anywhere between the ends 16 and 18 that is not necessarily centered as in the embodiment shown.

As shown most clearly in FIG. 2, the socket 32 includes an aperture 34 that opens adjacent the lower side edge 22. The aperture 32 extends upwardly into the width of the key 10 but is preferably closed at the top as shown in FIG. 1. That is, the aperture 34 does not extend entirely through the width of the handle portion. The aperture 32 has a substantially rectangular cross section and is adapted to fit onto the rectangularly shaped end 36 of an oxygen tank valve control stem. As can be seen from the drawings, the axis of the aperture 32 is parallel to the plane of the handle portion 14 but is perpendicular to the length direction of the handle portion.

Figure 3:
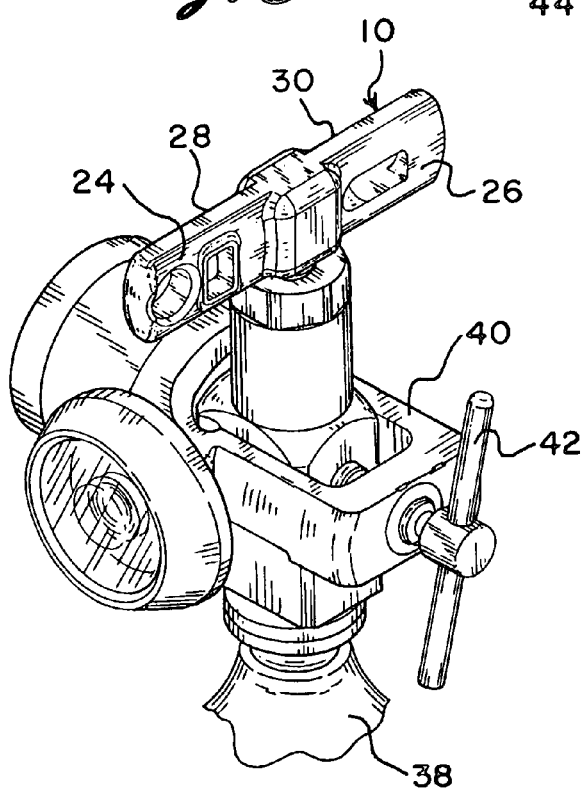
FIG. 3 is a view similar to FIG. 1 but showing the key secured to the valve stem of an oxygen tank.

FIG. 3 shows the oxygen tank key 10 of the present invention placed over a stem 36 of an oxygen tank 10. As should now be readily apparent to those skilled in the art, when it is desired to open or close the valve of the tank 38, the operator's hand pushes on the various faces 24, 26, 28 and 30, as required. Because these are relatively wide and flat surfaces, it is easier to push (or pull) thereon without causing discomfort or injury to the operator's hand.

The oxygen tank key 10 of the present invention is also useful for loosening the yoke or clamp that attaches the regulator to the tank. Such regulators are, per se, well known and an example of one is shown in FIG. 3 and designated at 40. As is also well known in the art, regulator 40 is normally provided with a lever 42 of circular cross section which is normally turned by hand in order to clamp the regulator 40 onto the tank 38.

Attaching the regulator 40 to the tank 38 by rotating the lever 42 clockwise is normally of no particular difficulty. Unfortunately, it frequently occurs that the regulator is clamped too tight to the tank 38 or because of corrosion or the like, it cannot be opened easily.

The present invention addresses this problem by providing an elongated slot 44 in the handle portion 14. As can be seen from FIGS. 1 and 2, the slot 44 passes entirely through the handle portion in a direction that is perpendicular to the plane of the handle portion and is elongated extending in the direction of the length of the handle portion. While the top and bottom interior walls of the elongated slot 44 are substantially perpendicular to the faces 26 and 30, the inner surface of the wall is chamfered toward the socket 32 as shown at 46. Similarly, the inner surface of the wall of the slot 44 on the rear surface 30 is chamfered toward the end 18 of a handle portion 14 as shown at 48. These chamfered wall portions 46 and 48 help to provide an increased mechanical advantage when it is necessary to utilize the key 10 to loosen the regulator 40. The chamfered wall portions also provide greater surface contact with the lever or thumb screw 42 which spreads pressure over a greater area so as not to damage the lever. This arrangement, therefore, requires less force from the user to achieve the same result.

Figure 4:
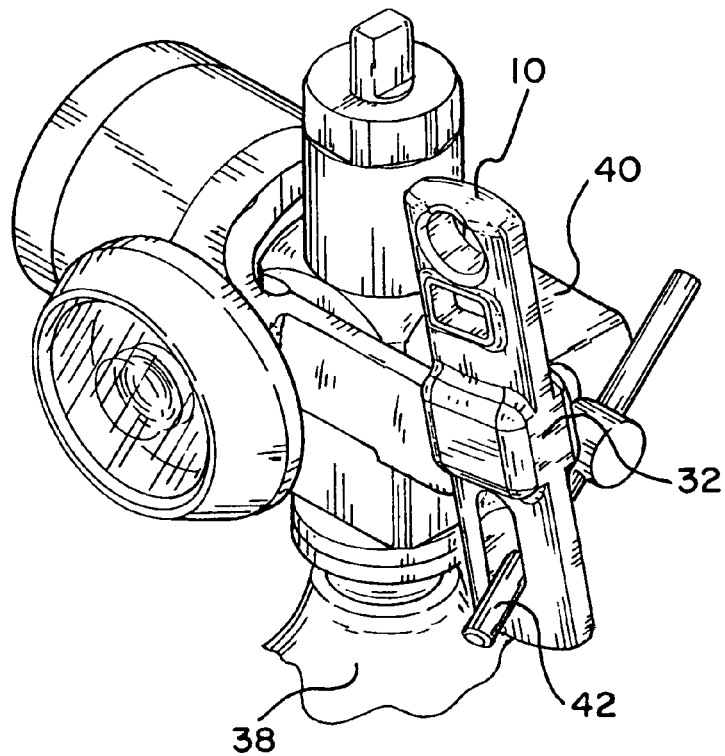
FIG. 4 is a perspective view of the new key showing the same being applied to the lever of a regulator for an oxygen tank.
Figure 5:
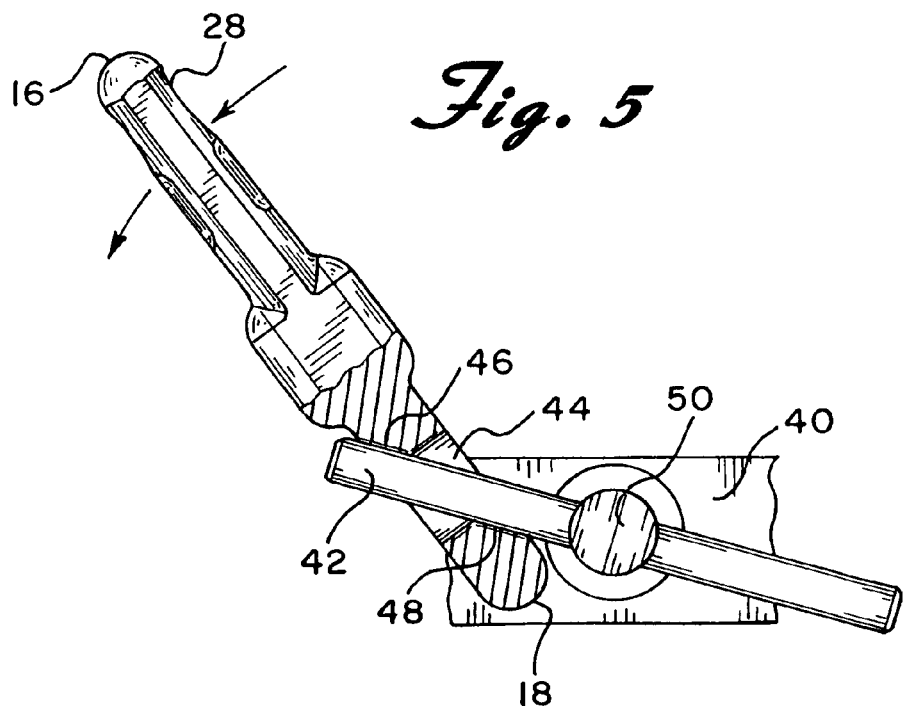
FIG. 5 is a top view of the key, shown partially in cross-section, illustrating how the key is used to aid in removing a regulator from an oxygen tank.

In order to utilize the key 10 to loosen the regulator 40, one end of the lever 42 is inserted through the slot 44 from the rear surface 30 of the key 10 as illustrated in FIG. 4. The key is then rotated counterclockwise as shown in FIG. 5 until the chamfered surfaces 46 and 48 engage the lever 42. At this point, a further slight downward pressure on the face 28 adjacent the end 16 of the key 10 will be sufficient to rotate the lever 42 counterclockwise.

As can be seen from FIG. 5, the shape of the elongated slot 44 along with the chamfered surfaces 46 and 48 significantly increase the mechanical advantage of the key 10. This is primarily due to the fact of the increased distance from the end 16 of the key 10 to the axis 50 of the regulator clamp as compared to the device shown, for example, in the Kaniaris patent described above wherein the key would be 90° to the axis of the lever 42. As pointed out above, the manner in which the Kaniaris device engages at appoint can cause damage to the lever or thumb screw.

The key 10 of the present invention may include an additional aperture 52 formed therein which may allow the same to be used in a more conventional manner as other keys are used or which may include a different shape for other types of oxygen or other air tanks. Similarly, the key 10 of the present invention may be provided with a smaller round or other shaped aperture 54 which will allow the same to be carried on a key chain or the like.

The present invention may be embodied on other specific forms without departing from the spirit or essential attributes thereof and accordingly, reference should be made to the appended claims rather than to the foregoing specification as indicating the scope of the invention.

I claim:

1. An oxygen tank key comprising:
   an elongated substantially thin flat handle portion defining a first plane and having first and second ends that define the length thereof, first and second side edges that define the width thereof and first and second planar faces that define the thickness thereof;
   a socket integrally formed with said handle portion and located intermediate said ends of said handle portion at approximately the midpoint of the length of said handle portion, said socket having, a thickness that is greater than the thickness of said handle portion and which extends the width of the handle portion;
   said socket including an aperture having an axis parallel to said first plane but perpendicular to the length of said handle portion, said aperture being open adjacent one of said side edges and having a depth extending into but not entirely through the width of said handle portion whereby the other of said side edges is closed, said aperture having a substantially rectangular cross-section and being adapted to fit onto the rectangularly shaped end of an oxygen tank valve control stem, and
   an elongated slot passing entirely through said handle portion in a direction perpendicular to said plane, said slot being elongated in the direction of the length of said handle portion and having first and second ends, said first end of said slot being chamfered at said first planar face of said handle portion and said second end of said slot being chamfered at said second planar face of said handle portion.

2. The oxygen tank key as claimed in claim 1 wherein said slot is adapted to fit over the lever of a regulator for an oxygen tank to help release the regulator from said tank.

* * * * *